United States Patent
Toral Gomez et al.

(10) Patent No.: US 8,171,957 B2
(45) Date of Patent: May 8, 2012

(54) LIQUID DISTRIBUTOR VALVE

(75) Inventors: Alex Toral Gomez, La Garriga (ES);
Miguel Ibanez Sapina, La Garriga (ES);
Josep Salgado Salichs, La Garriga (ES)

(73) Assignee: Valvules I Racords Canovelles, S.A.,
La Garriga, (Barcelona) (ES)

( * ) Notice: Subject to any disclaimer, the term of this patent is extended or adjusted under 35 U.S.C. 154(b) by 554 days.

(21) Appl. No.: 12/369,577

(22) Filed: Feb. 11, 2009

(65) Prior Publication Data

US 2009/0242812 A1 Oct. 1, 2009

(30) Foreign Application Priority Data

Mar. 31, 2008 (ES) .............................. 200800631 U

(51) Int. Cl.
*F16K 11/074* (2006.01)
(52) U.S. Cl. ......... 137/625.11; 137/625.46; 251/129.11; 251/248
(58) Field of Classification Search ............. 137/625.46, 137/625.11, 625.47; 251/129.11, 129.12, 251/129.13, 250.5, 248
See application file for complete search history.

(56) References Cited

U.S. PATENT DOCUMENTS

| | | | | |
|---|---|---|---|---|
| 2,100,154 A * | 11/1937 | Ashton | ................... | 137/624.13 |
| 2,871,883 A * | 2/1959 | Dunlap | ................... | 137/624.12 |
| 2,884,006 A * | 4/1959 | Hoback | ................... | 137/625.11 |
| 3,307,579 A * | 3/1967 | Beddoes | ................... | 137/624.18 |
| 3,319,655 A * | 5/1967 | Palmer | ................... | 137/624.18 |
| 3,633,623 A * | 1/1972 | Perry et al. | ................... | 137/625.46 |
| 4,398,562 A * | 8/1983 | Saarem et al. | ................... | 137/625.47 |
| 4,807,662 A * | 2/1989 | Verne | ................... | 137/554 |
| 5,181,540 A * | 1/1993 | Campau | ................... | 137/625.46 |
| 5,226,454 A * | 7/1993 | Cabalfin | ................... | 137/870 |
| 6,000,875 A * | 12/1999 | Staniszewski | ................... | 403/370 |
| 6,173,743 B1 * | 1/2001 | Ibanez Sapina | ................... | 137/625.46 |
| 6,257,271 B1 * | 7/2001 | Babin et al. | ................... | 137/315.17 |
| 6,941,970 B2 * | 9/2005 | Ibanez Sapina et al. | . | 137/625.11 |
| 7,308,904 B2 * | 12/2007 | Bria et al. | ................... | 137/311 |
| 7,506,664 B2 * | 3/2009 | Norris et al. | ................... | 137/625.46 |
| 2004/0035475 A1 * | 2/2004 | Bradford et al. | ................... | 137/625.11 |
| 2009/0120520 A1 * | 5/2009 | Weiss | ................... | 137/625.46 |

* cited by examiner

*Primary Examiner* — John Rivell
*Assistant Examiner* — Minh Le
(74) *Attorney, Agent, or Firm* — Katten Muchin Rosenman LLP

(57) ABSTRACT

A liquid distributor valve includes a compartmented base body with a cover and several outlets and one inlet. A rotatable obturator bell is inwardly arranged and has a shaft projecting through the cover and governed by an externally arranged electronic control having an independent assembly adapted to fit onto the base body. The actuation on the shaft of the obturator bell from the gearmotor of the externally arranged electronic control is carried out through a pinion driven by the shaft of the gearmotor and enmeshed with a gear wheel linked to the shaft of the obturator bell. The linking between the gear wheel and the shaft of the obturator bell is accomplished by a tubular body having an external thread matching the thread provided in the inside of the neck forming an extension of the gear wheel.

3 Claims, 2 Drawing Sheets

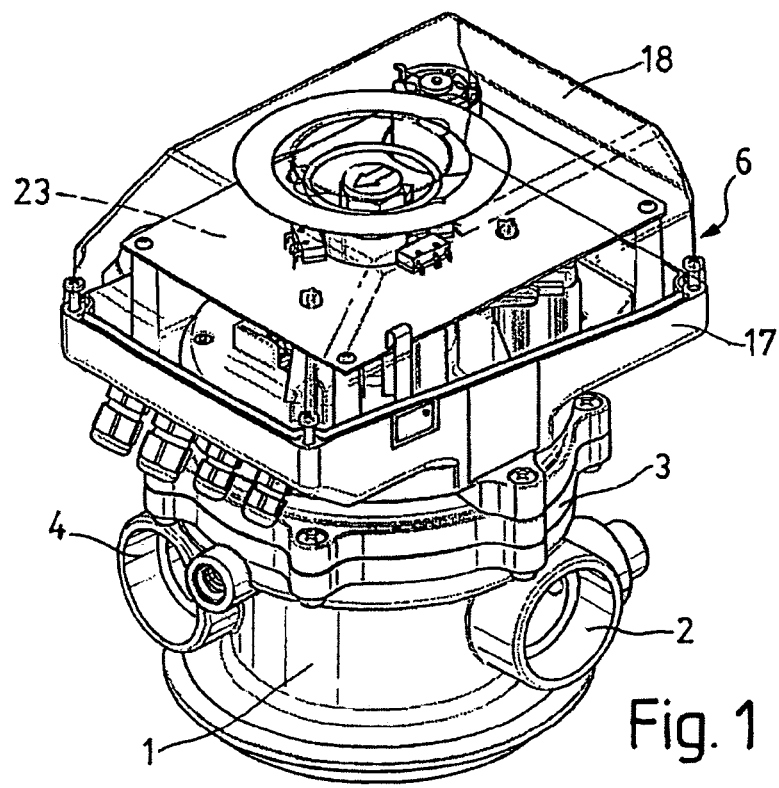
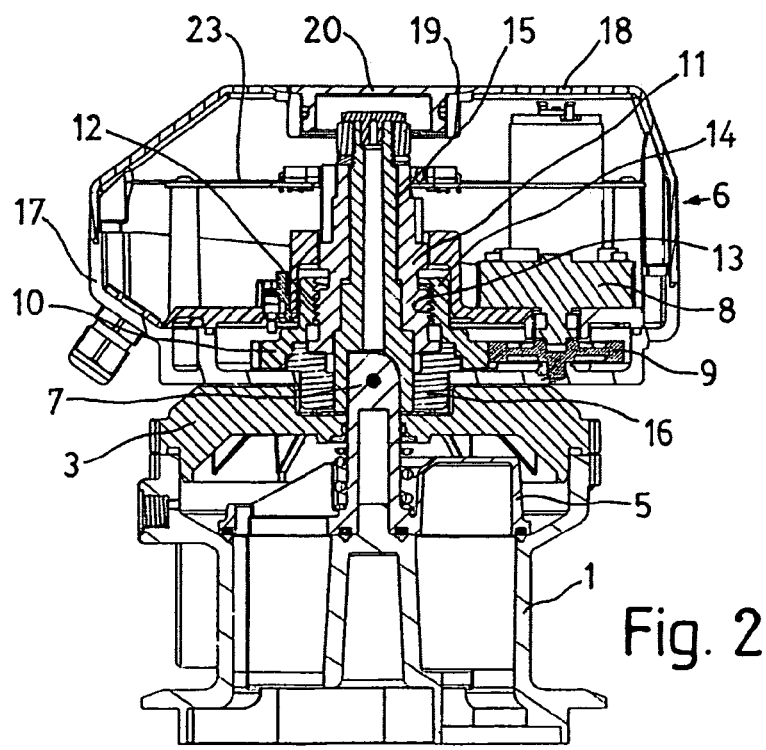

LIQUID DISTRIBUTOR VALVE

This application claims benefit of Serial No. 200800631 U, filed 31 Mar. 2008 in Spain and which application is incorporated herein by reference. To the extent appropriate, a claim of priority is made the above disclosed application.

BACKGROUND OF THE INVENTION

Liquid distributor valves are known which comprise a radially compartmented base body having several outlets and a lateral inlet, a rotatable obturator bell being interposed between said outlets and said inlet and being provided with an upperly arranged shaft projecting through the top cover of said body and being actuated by a manual or electronic, externally arranged control.

This type of electronically actuated valves has the drawback that the electronic control portion and the mechanical portion acting within the base body are linked to each other thus forming an assembly. This represents a substantial drawback when there is a need to repair the electronic portion or the mechanical portion, since the assembly being made up by them must then be disassembled in order to replace or repair the affected components.

It has been attempted to obviate said drawbacks by forming the externally arranged electronic control as per a totally independent assembly being adapted to be removably fitted onto the base body.

The means being used to actuate the shaft of the obturator bell from the externally arranged electronic control, and namely from the gearmotor forming part of said electronic control, are nevertheless complex in their mechanical make-up.

SUMMARY OF THE INVENTION

This invention has as its object a liquid distributor valve having a simplified and compact make-up. A characterising feature lies in the actuation on the shaft of the obturator bell from the gearmotor of the externally arranged electronic control through a pinion being driven by the gearmotor shaft and enmeshed with a gear wheel being linked to the shaft of the obturator bell.

This linking between the gear wheel and the shaft of the obturator bell is accomplished by means of a tubular body having an external thread matching the thread being provided in the inside of a neck forming an extension of the gear wheel, said tubular body being fitted onto a tubular spindle being linked to the shaft of the obturator bell.

These and other characterising features will be best made apparent by the following detailed description whose understanding will be made easier by the accompanying two sheets of drawings showing a practical embodiment being cited only by way of example not limiting the scope of the present invention.

BRIEF DESCRIPTION OF THE DRAWINGS

In the drawings:
FIG. 1 illustrates in a perspective view the distributor valve being the object of the invention;
FIG. 2 depicts said valve in a sectional elevation.

DETAILED DESCRIPTION OF THE INVENTION

Figure 3:
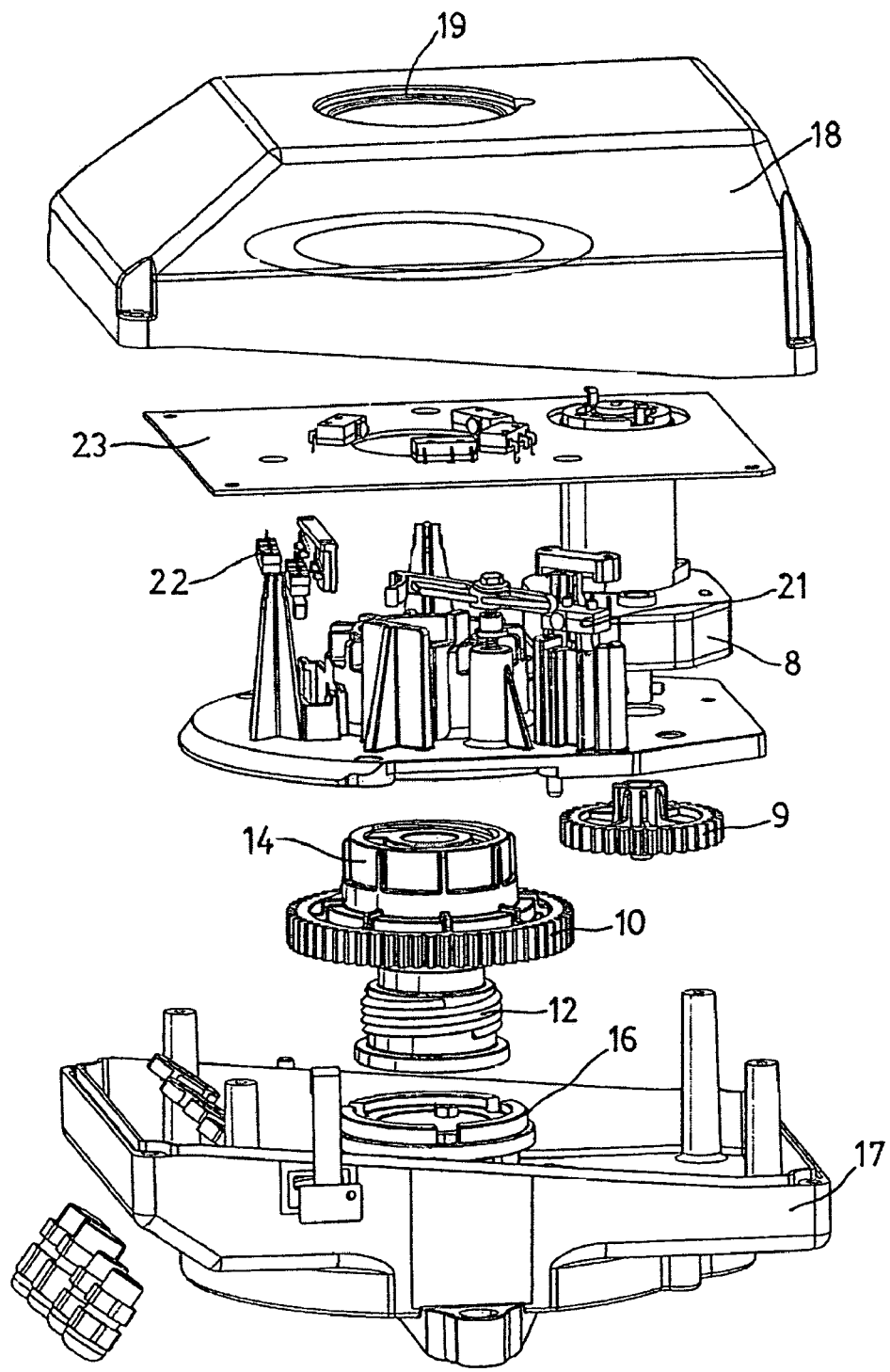
FIG. 3 shows in a perspective view the assembly making up the externally arranged electronic control with its basic components shown in an exploded arrangement.

According to the drawings this liquid distributor valve comprises a compartmented base body (1) having several outlets (2), a cover (3) being fastened onto said base body, this latter having a lateral inlet (4) for the liquid.

Between the body (1) and the cover (3) a rotatable obturator bell (5) is arranged which is governed by an electronic control (6) being superimposed on the cover (3), the shaft (7) corresponding to the obturator bell (5) projecting through a central orifice of said cover (FIG. 2).

A characterising feature of this distributor valve lies in the fact of acting on the shaft (7) of the obturator bell from the gearmotor (8) of the electronic control (6) through a pinion (9) being driven by the shaft of the gearmotor (8) and enmeshed with a gear wheel (10) being linked to the shaft (7) of the obturator bell.

This linking between the gear wheel (10) and the shaft (7) is accomplished by means of a tubular body (11) having an external thread (12) matching the thread (13) being provided in the inside of a neck (14) forming an extension of the gear wheel (10), said tubular body (11) being fitted onto a tubular spindle (15) being linked to the shaft (7) of the obturator bell, a boss (16) being arranged underneath the gear wheel and the tubular body and fitted onto the tubular spindle (15).

The assembly making up the electronic control (6) comprises a base (17) and a cap (18) having a top opening (19) allowing to have access to the components of the control, said opening being adapted to be closed with a stopper (20).

With reference numbers (21, 22) the microswitches are denoted which are linked to the catch being operable for stabilising the different positions of the obturator bell (5), and reference number (23) denotes the electronics board with the printed circuit.

The reduced height dimensions of the electronic control (6) and the compartmented body (1) determine a compact assembly.

The invention can within its essentiality be put into practice in other embodiments only in detail differing from the one having been described above only by way of example, said other embodiments also falling within the scope of the protection being sought. This liquid distributor valve can hence be manufactured in any shape and size, with the best suited means and materials and with the most convenient accessories, and its integrating elements can be replaced with others being technically equivalent, all this falling within the spirit of the appended claims.

The invention claimed is:
1. A liquid distributor valve comprising:
a compartmented base body with a cover and a plurality of outlets and an inlet;
a rotatable obturator bell innerly arranged and having a shaft projecting through said cover and governed by an externally arranged electronic control comprising an independent assembly adapted to be fitted onto the base body;
a pinion driven by a shaft of a gearmotor of the externally arranged electronic control and enmeshed with a gear wheel linked to the shaft of the obturator bell; wherein the pinion linked to the shaft of the gearmotor actuates the shaft of the obturator bell from the gearmotor of the externally arranged electronic control;
a tubular body having an external thread matching the thread provided in the inside of a neck forming an extension of the gear wheel, said tubular body being fitted onto a tubular spindle to link the gear wheel and the shaft of the obturator bell.

2. A liquid distributor valve, as per claim 1, wherein a boss is arranged underneath the gear wheel and the tubular body is fitted onto the tubular spindle.

3. A liquid distributor valve, as per claim 1, wherein the independent assembly comprises a base and a cap, the cap having a top opening providing access to components of the electronic control, said opening being adapted to be closed by a stopper.

* * * * *